US009954671B2

United States Patent
Ohbi

(10) Patent No.: US 9,954,671 B2
(45) Date of Patent: *Apr. 24, 2018

(54) INFORMATION PROCESSING APPARATUS, SYNCHRONIZATION CORRECTION METHOD AND COMPUTER PROGRAM

(71) Applicant: Sony Corporation, Tokyo (JP)

(72) Inventor: Seiji Ohbi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/291,931

(22) Filed: Oct. 12, 2016

(65) Prior Publication Data

US 2017/0033917 A1 Feb. 2, 2017

Related U.S. Application Data

(63) Continuation of application No. 14/601,020, filed on Jan. 20, 2015, now Pat. No. 9,479,324, which is a
(Continued)

(30) Foreign Application Priority Data

Jun. 12, 2009 (JP) .................. 2009-141563

(51) Int. Cl.
*H04L 7/00* (2006.01)
*H04N 21/43* (2011.01)
(Continued)

(52) U.S. Cl.
CPC .............. *H04L 7/002* (2013.01); *H04L 67/42* (2013.01); *H04N 5/765* (2013.01);
(Continued)

(58) Field of Classification Search
CPC ......... H04L 7/002; H04L 67/42; H04N 5/765; H04N 21/234218; H04N 21/4302; H04N 21/4307; H04N 21/43615
(Continued)

(56) References Cited

U.S. PATENT DOCUMENTS 6,370,159 B1 * 4/2002 Eidson ...................... G06F 1/14
370/503
7,440,474 B1 * 10/2008 Goldman .............. H04J 3/0664
370/503
(Continued)

FOREIGN PATENT DOCUMENTS

JP 2003-235027 8/2003
JP 2003-259365 9/2003
(Continued)

OTHER PUBLICATIONS

No Author Listed, Sound recording and reproduction, Wikipedia, the free encyclopedia, http://en.wikipedia.org, Old revision as edited by Jpbowen Jun. 6, 2009, last accessed on Oct. 24, 2013.

*Primary Examiner* — Stephen J Clawson
(74) *Attorney, Agent, or Firm* — Wolf, Greenfield & Sacks, P.C.

(57) ABSTRACT

An information processing apparatus is provided which includes a transmission unit for transmitting a query request for querying another device for a count value held by such other device, a reception unit for receiving a return of the count value from such other device, a correction unit for performing, at a predetermined period, correction processing for synchronizing sampling frequency with such other device based on the received count value, and a reproduction unit for reproducing content in synchronization with such other device based on the sampling frequency. The correction unit corrects by taking into account a Round Trip Time
(Continued)

between the transmission of the query request and the reception of the return and residual difference occurred at a previous correction time.

16 Claims, 11 Drawing Sheets

Related U.S. Application Data continuation of application No. 12/793,039, filed on Jun. 3, 2010, now Pat. No. 8,971,355.

(51) Int. Cl.
| | |
|---|---|
| *H04N 5/765* | (2006.01) |
| *H04N 21/2343* | (2011.01) |
| *H04N 21/436* | (2011.01) |
| *H04L 29/06* | (2006.01) |

(52) U.S. Cl.
CPC . *H04N 21/234318* (2013.01); *H04N 21/4302* (2013.01); *H04N 21/4307* (2013.01); *H04N 21/43615* (2013.01)

(58) Field of Classification Search
USPC .......................................................... 370/503
See application file for complete search history.

(56) References Cited

U.S. PATENT DOCUMENTS

| | | | |
|---|---|---|---|
| 8,971,355 B2 | 3/2015 | Ohbi | |
| 9,479,324 B2* | 10/2016 | Ohbi | ...................... H04N 5/765 |
| 2003/0103486 A1* | 6/2003 | Salt | ........................... G06F 1/14 |
| | | | 370/350 |
| 2006/0039347 A1* | 2/2006 | Nakamura | ............ H04J 3/0647 |
| | | | 370/350 |
| 2008/0107137 A1 | 5/2008 | Yasui | |
| 2009/0052431 A1* | 2/2009 | Kroener | ................ H04J 3/0664 |
| | | | 370/350 |
| 2010/0318860 A1 | 12/2010 | Ohbi | |
| 2015/0142883 A1 | 5/2015 | Ohbi | |

FOREIGN PATENT DOCUMENTS

| | | |
|---|---|---|
| JP | 2005-122548 A | 5/2005 |
| JP | 2005-184383 A | 7/2005 |
| JP | 2005-191786 A | 7/2005 |

* cited by examiner

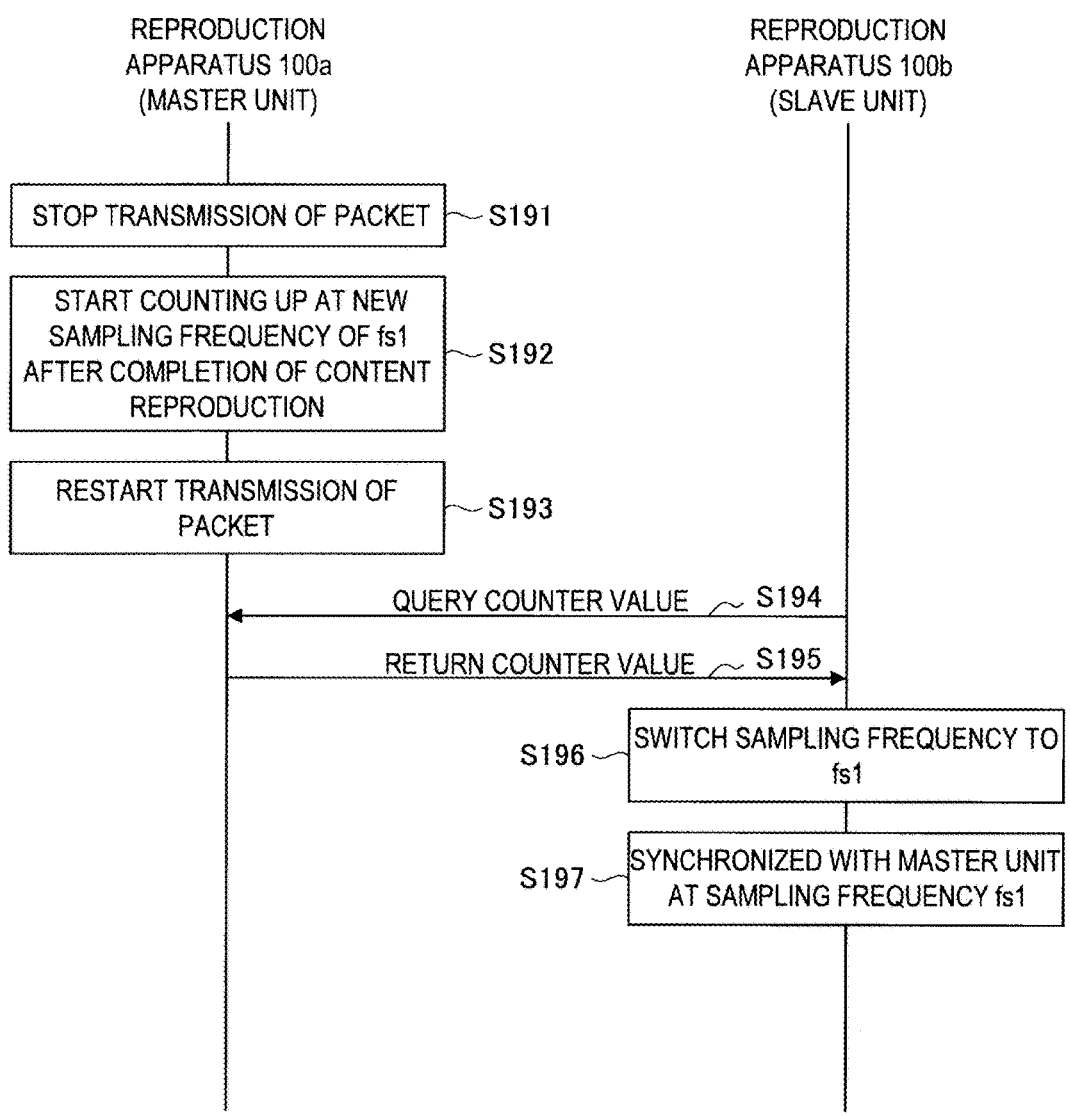

INFORMATION PROCESSING APPARATUS, SYNCHRONIZATION CORRECTION METHOD AND COMPUTER PROGRAM

CROSS REFERENCES TO RELATED APPLICATIONS

This application is a continuation of and claims the benefit under 35 U.S.C. § 120 of U.S. patent application Ser. No. 14/601,020, titled "INFORMATION PROCESSING APPARATUS, SYNCHRONIZATION CORRECTION METHOD AND COMPUTER PROGRAM," filed on Jan. 20, 2015, which is a continuation of U.S. patent application Ser. No. 12/793,039, titled "INFORMATION PROCESSING APPARATUS, SYNCHRONIZATION CORRECTION METHOD AND COMPUTER PROGRAM," filed on Jun. 3, 2010, which claims priority under 35 U.S.C. § 119 to Japanese Priority Patent Application No. 2009-141563, filed on Jun. 12, 2009, each of which is hereby incorporated by reference in its entirety.

BACKGROUND OF THE INVENTION

Field of the Invention

The present invention relates to an information processing apparatus, a synchronization correction method and a computer program.

Description of the Related Art

In related art, there is provided a content reproduction system in which, for example between a server and a client device including a communication function conforming to the TCP/IP (Transmission Control Protocol/Internet Protocol), content such as audio or video stored in the server is transferred to the client device (reproduction apparatus) via a network and is reproduced. In the content reproduction system, in general, the client device first requests the server for retrieval of reproducible content and for transmission of a list of the reproducible content and receives the list of the reproducible content transmitted from the server in response to the request. Furthermore, the client device requests the server for transmission of content selected from the list described above by a user and can reproduce the content transmitted from the server in response to the request, while receiving the content.

At this time, the client device sequentially temporarily stores (buffers) content data streamed from the server in a buffer memory and when a predetermined amount of data is stored in the buffer memory, the client device reads out the content data from the buffer memory and starts reproduction. Moreover, in the case where the client device only supports uncompressed digital data, the server, for example, decodes (expands) compressed digital data which has been compressed and encoded by an encoding system such as the MP3 (MPEG Audio Layer3), converts the data into, for example, linear PCM data which is uncompressed data and transmits the data to the client device.

In the content reproduction system described above, a plurality of client devices can be connected to a network and the plurality of client devices can receive the same content from the server and can synchronously reproduce it. For example, when a party is held at a user's home, a home network system including a client device set in a living room and a client device set in a bedroom may be used in a form in which the client devices in the living room and the bedroom synchronously reproduce the same music content.

As a method for realizing synchronous reproduction by a plurality of client devices, there is disclosed a technology in which a server simultaneously distributes the same content to a plurality of client devices by using a multicast (e.g., UDP (User Datagram Protocol) multicast) and the plurality of client devices synchronously reproduce the content (e.g., JP-A-2006-237918). In this case, in order to realize the synchronous reproduction with high accuracy, it is necessary to notify each of the client devices of a reproduction timing, and in the aforementioned JP-A-2006-237918, the server (e.g., HDD recorder) performs time management (calculation, notification and the like of the reproduction timing) for performing the synchronous reproduction. Moreover, there is also disclosed a content reproduction system to easily realize synchronous reproduction which does not need a specified router for connecting devices and which also can be performed through wireless connection, without performing the time management on the server side nor the slave terminal (client terminal) side (e.g., refer to JP-A-2008-160518).

SUMMARY OF THE INVENTION

In the related art, synchronous reproduction was performed by the plurality of client devices receiving the same content from the server and a certain device (host device) transmitting a reproduction instruction to other devices (guest devices). However, in the content reproduction system in the related art, there was an issue that when it was used continuously for a long time, for example, the reception timing of the reproduction instruction from the host device gradually lagged behind, and thereby the reproduction of content became out of synchronization between the host device and the guest device.

In light of the foregoing, it is desirable to provide an information processing apparatus, a synchronization correction method and a computer program which are novel and improved, and which are capable of performing a query from a slave unit (guest device) to a master unit (host device) on a regular basis and performing an appropriate correction on the slave unit side in order to synchronize sampling frequency between the master unit and the slave unit, thereby synchronizing reproduction timing of content between the master unit and the slave unit.

According to an embodiment of the present invention, there is provided an information processing apparatus which includes a transmission unit for transmitting a query request for querying another device for a count value held by such other device, a reception unit for receiving a return of the count value from such other device, a correction unit for performing, at a predetermined period, correction processing for synchronizing sampling frequency with such other device based on the received count value, and a reproduction unit for reproducing content in synchronization with such other device based on the sampling frequency. The correction unit corrects by taking into account a round trip time between the transmission of the query request and the reception of the return and residual difference occurred at a previous correction time.

When the sampling frequency is greater than such other device, the correction unit may increase or decrease the number of samples of the content to be reproduced in the reproduction unit, thereby performing the correction for synchronizing the sampling frequency with such other device.

When increasing the number of the samples, the correction unit may increase the number of the samples by interpolation by using samples proceeding and following a target sample.

The correction unit may correct the sampling frequency according to a sampling clock of the content reproduced in such other device.

The content reproduced by the reproduction unit may be transmitted from such other device.

According to another embodiment of the present invention, there is provided a method which includes a transmission step of transmitting a query request for querying another device for a count value held by such other device, a reception step of receiving a return of the count value from such other device, and a correction step of performing, at a predetermined period, correction processing for synchronizing sampling frequency with such other device based on the received count value. The correction step corrects by taking into account a round trip time between the transmission of the query request and the reception of the return and residual difference occurred at a previous correction time.

According to another embodiment of the present invention, there is provided a method which includes a computer program for causing a computer to execute the steps of a transmission step of transmitting a query request for querying another device for a count value held by such other device, a reception step of receiving a return of the count value from such other device, and a correction step of performing, at a predetermined period, correction processing for synchronizing sampling frequency with such other device based on the received count value. The correction step corrects by taking into account a round trip time between the transmission of the query request and the reception of the return and residual difference occurred at a previous correction time.

According to the embodiments of the present invention described above, there can be provided the information processing apparatus, the synchronization correction method and the computer program which are novel and improved, and which are capable of performing the query from the slave unit (guest device) to the master unit (host device) on a regular basis and performing the appropriate correction on the slave unit side in order to synchronize sampling frequency between the master unit and the slave unit, thereby synchronizing reproduction timing of content between the master unit and the slave unit.

BRIEF DESCRIPTION OF THE DRAWINGS

FIG. 11 is a flowchart showing frequency adjustment processing on content.

DETAILED DESCRIPTION OF THE EMBODIMENT

Figure 1:
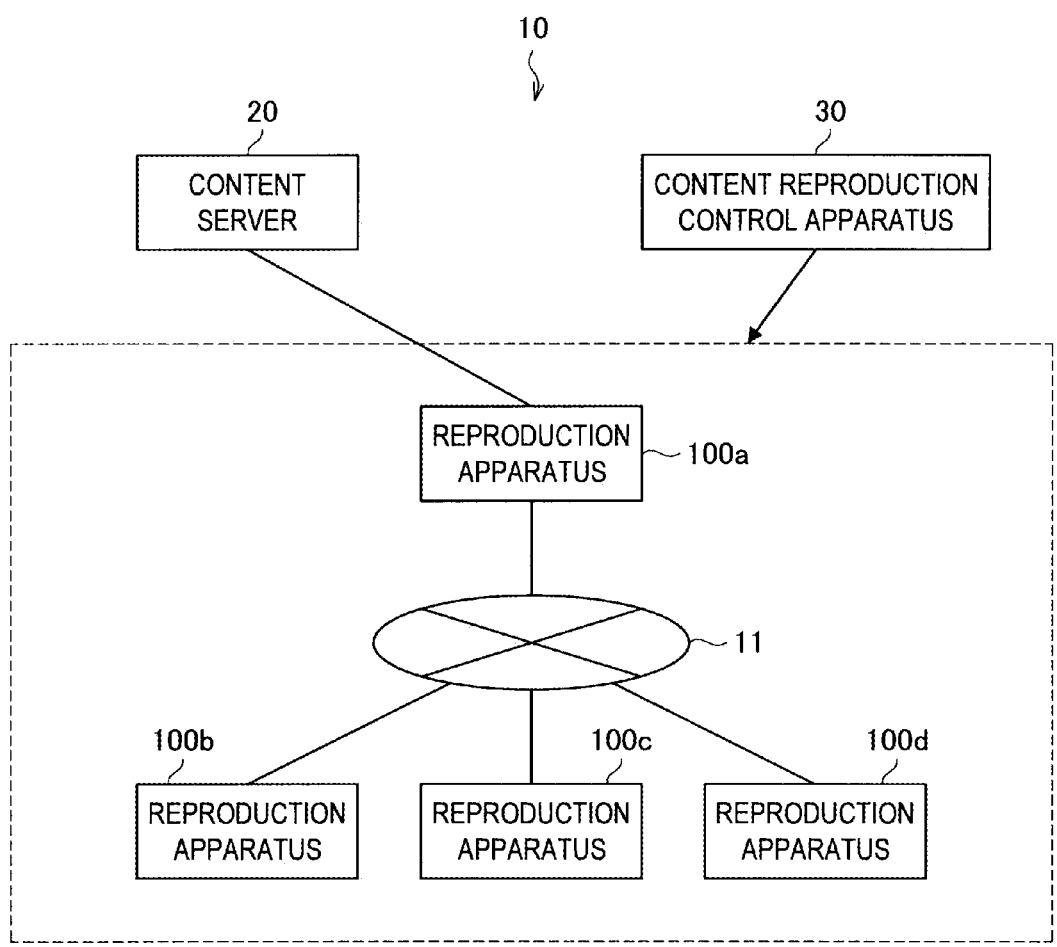
FIG. 1 is an explanatory diagram showing a configuration of a content reproduction system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Moreover, a preferred embodiment of the present invention will be described in detail in the following order.
<1. Embodiment of the Present Invention>
  [1-1. Configuration of a content reproduction system]
  [1-2. Configuration of a reproduction apparatus]
  [1-3. Content reproduction processing]
  [1-4. Sampling frequency synchronization processing]
  [1-5. Content transmission processing]
  [1-6. Frequency adjustment processing on content]
<2. Summary>
<1. Embodiment of the Present Invention>
  [1-1. Configuration of a Content Reproduction System]

FIG. 1 is an explanatory diagram showing a configuration of a content reproduction system according to an embodiment of the present invention. In the following, the configuration of the content reproduction system according to the embodiment of the present invention will be described using FIG. 1.

A content reproduction system 10 according to the embodiment of the present invention is a network system interconnects a plurality of apparatus, which may be provided in a house of a user or the like. As shown in FIG. 1, the content reproduction system 10 according to the embodiment of the present invention includes a plurality of reproduction apparatus 100a, 100b, 100c, 100d and etc. In addition, the reproduction apparatus 100a, 100b, 100c, 100d and etc will be also simply referred to as reproduction apparatus 100 when they are collectively referred to. The content reproduction system according to the embodiment of the present invention is configured so that, among the plurality of reproduction apparatus 100a, 100b, 100c, 100d and etc., at least one reproduction apparatus reproduces content, and the other reproduction apparatus can obtain the same content as that reproduced in at least such one reproduction apparatus and can synchronize and reproduce the content in the same timing. For example, it is configured so that, in the case where the reproduction apparatus 100a is reproducing content, the other reproduction apparatus 100b, 100c, 100d and etc. can receive the content from the reproduction apparatus 100a wired or wirelessly and can reproduce the same content that the reproduction apparatus 100a is reproducing, in the same timing as the reproduction apparatus 100a. A configuration of each of the reproduction apparatus will be described in detail below. Moreover, in the following, the reproduction apparatus that first reproduces content will be also referred to as a "master unit" and the reproduction apparatus that receives the content from the master apparatus will be also referred to as "slave unit" for the convenience of the description. Then, the following description will be made with the reproduction apparatus 100a as a master unit and the reproduction apparatus 100b, 100c, 100d and etc. as slave units.

Here, the content may be any form of content, such as audio content such as music, a lecture or a radio program, video content that includes image data such as a motion picture, a television program or a video program and/or audio data, or game content. In the following, the description will be made taking the audio content, particularly the music content, as an example of the content, but the content of the present invention is not limited to the example.

The reproduction apparatus 100a, 100b, 100c, 100d and etc. are interconnected via a LAN 11. The LAN 11 may be wired or wireless and may take the form of a wired network such as 10 BASE-2 or 1000 BASE-T, for example, or may also take the form of a wireless LAN based on the IEEE (Institute of Electrical and Electronics Engineer) 802.11 standard or another standard, for example. Moreover, the reproduction apparatus 100a, 100b, 100c, 100d and etc. may be connected via a router or an access point or may be directly connected in an ad-hoc mode without through the access point.

The reproduction apparatus 100a, 100b, 100c, 100d and etc. are set in each of a living room, a bed room, a kitchen, a bathroom and etc. These reproduction apparatus 100a, 100b, 100c, 100d and etc. are configured to be able to synchronize and reproduce the same content.

The content reproduced by the reproduction apparatus 100a which is a master unit may be the content stored in the reproduction apparatus 100a or may be the content stored in another device, for example, a content server 20 shown in FIG. 1. The content server 20 is configured as a DMS (Digital Media Server) capable of recording, storing and distributing the content. The content server 20 may be, for example, a DLNA-compatible device that conforms to the DLNA (Digital Living Network Alliance) guideline and that transmits and receives data. The content server 20 may be a notebook/desktop PC (Personal Computer), for example, but may also be any one of other types of information processing apparatus such as a network storage device, a server device for home network, a data recording device (DVD/HDD recorder or the like), a game device, or an intelligent home appliance, for example.

The content server 20 obtains and holds a plurality of music contents. For example, the content server 20 can receive content distributed from a content distribution server (not shown in figures) that provides content distribution service via a public circuit network (not shown in figures) such as the Internet or a WAN (Wide Area Network) and can store the distributed content in a storage device such as a HDD (Hard Disk Drive). Moreover, the content server 20 can also create new content by self-recording (self audio recording or video recording), by ripping or the like and can store the new content in the storage device, a removable storage medium or the like. In addition, the self-recording is to record, as digital data, images/sounds that are photographed/collected by an imaging device/sound collecting device auxiliary to the content server 20. Moreover, the ripping is to extract digital content (audio data/video data and the like) that is recorded in a recording medium such as a music CD, a video DVD or the like, to convert the content into a file format that can be processed in a computer, and then to record the content in the storage device, the removable storage medium or the like.

The content may be, for example, uncompressed digital data (referred to as "uncompressed data" hereinafter) such as linear PCM (Pulse Code Modulation) data or the like or may be compressed digital data (referred to as "compressed data" hereinafter) that is compressed by any one of a variety of compression encoding methods. Examples of the compression encoding method include, in the case of music content, an ATRAC (Adaptive TRansform Acoustic Coding), an ATRAC3, an MP3 (MPEG Audio Layer-3), an AAC (Advanced Audio Coding), and a WMA (Windows Media Audio).

In addition, the content reproduction system 10 according to the embodiment of the present invention may include a content reproduction control apparatus 30 for controlling the reproduction apparatus 100a which is a master unit. The content reproduction control apparatus 30 may be configured so as to cause the reproduction apparatus 100a to reproduce content and to specify a reproduction apparatus that will receive the content from the reproduction apparatus 100a and that will reproduce the content.

The reproduction apparatus 100 is a DMP (Digital Media Player) capable of reproducing content. The reproduction apparatus 100, like the content server 20 described above, may also be a DLNA-compatible device that conforms to the DLNA guideline and that transmits and receives data, for example. In the present embodiment, the reproduction apparatus 100 is a reproduction terminal device for reproducing and audio-outputting the content distributed from the content server 20 and may be a network audio client device, for example. The reproduction device 100 which is the network audio client device is provided with, for example, a display unit as a user interface such as a LCD panel, and moreover, with an externally attached audio output unit for audio-outputting the reproduced music content, such as a speaker. However, the reproduction apparatus according to the present invention is not limited to this example and may also be one of a variety of terminal devices such as a notebook personal computer (PC), a mobile music player, an Audio-Visual (AV) component, a PDA (Personal Digital Assistant), a home game device, a mobile game device, a mobile telephone, a PHS, a data reproduction device (a DVD/Blu-ray/HDD player or the like), or an intelligent home appliance such as a television receiver, for example.

Such reproduction apparatus 100 may have a function to select the content server 20, a function to obtain a content list from the content server 20, a function to select a content to be reproduced, a function to receive the content to be reproduced from the content server 20, and a function to reproduce and output the content. Specifically, the reproduction apparatus 100 searches for the content server 20 and then select from among the found content server 20 based on a user's input or the like or automatically, the content server 20 which will receive the content. Furthermore, the reproduction apparatus 100 obtains from the selected content server 20 information (the content list mentioned above) related to a plurality of contents held by the content server 20, and displays the information. The user can consult such content list and set the content desired to be reproduced as well as its reproduction mode. In response to the content selection or the like, the reproduction apparatus 100 can request the content server 20 to transmit the selected content in accordance with the set reproduction mode. When the content is streamed from the content server 20 to the reproduction apparatus 100 in response to the content transmission request, the reproduction apparatus 100, while receiving the content and temporarily storing the same in a buffer, reads the content from the buffer and performs a digital-to-analog conversion on the content and outputs the same.

The configuration of the content reproduction system 10 according to the embodiment of the present invention has been described above. Next, a configuration of the reproduction apparatus 100 according to the embodiment of the present invention will be described. In addition, in the following description, the configuration will be described with the reproduction apparatus 100 divided into the reproduction apparatus 100a which functions as a master unit and the reproduction apparatus 100b which functions as a slave unit, for the sake of convenience.

[1-2. Configuration of the Reproduction Apparatus]

Figure 2:
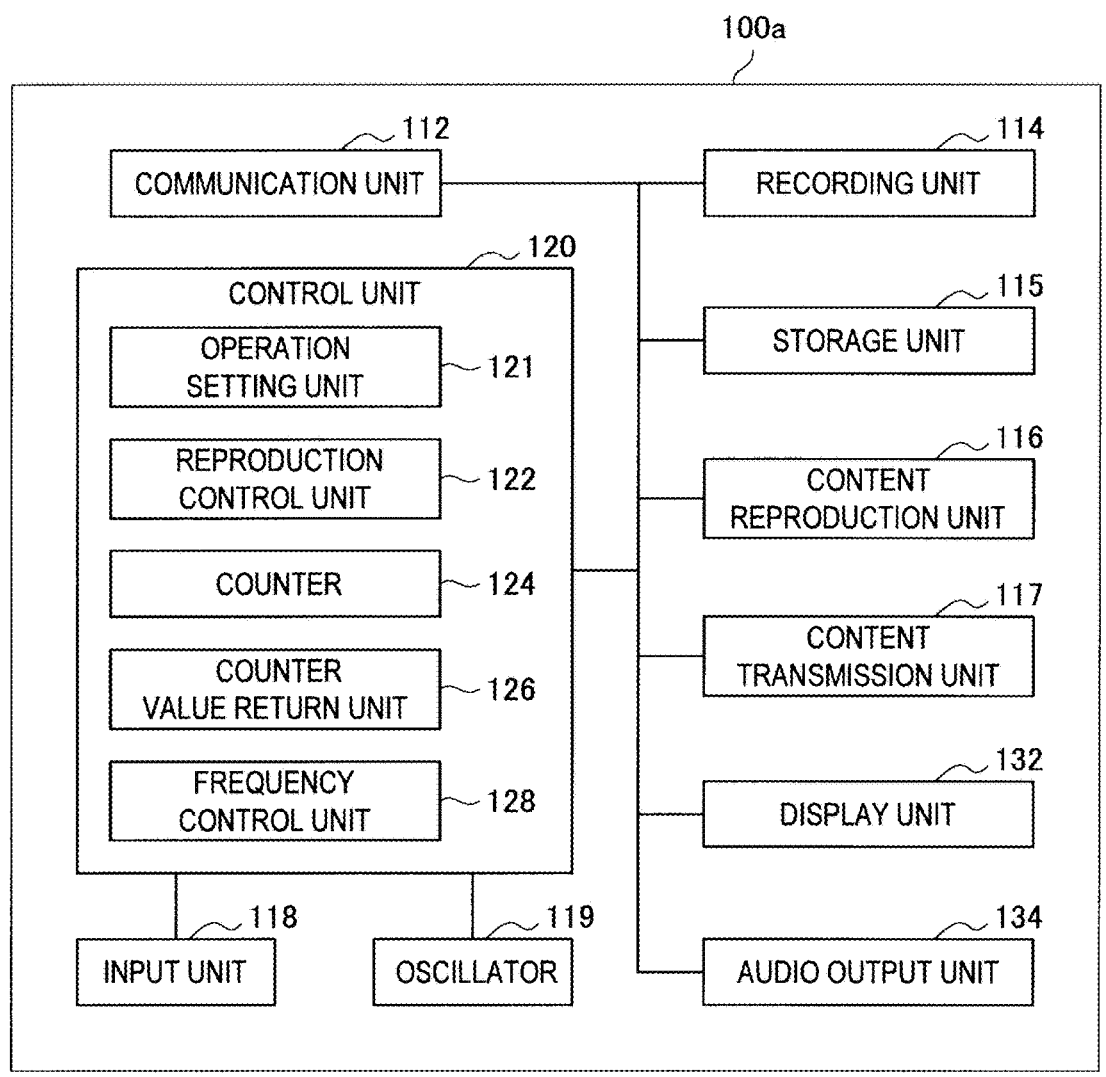
FIG. 2 is an explanatory diagram showing a configuration of a reproduction apparatus 100a which functions as a master unit.

First, a configuration of the reproduction apparatus 100a which functions as a master unit will be described. FIG. 2 is an explanatory diagram showing the configuration of the reproduction apparatus 100a which functions as a master unit. In the following, the configuration of the reproduction apparatus 100a according to the embodiment of the present invention will be described using FIG. 2.

As shown in FIG. 2, the reproduction apparatus 100a according to the embodiment of the present invention includes a communication unit 112, a recording unit 114, a storage unit 115, a content reproduction unit 116, a content transmission unit 117, an input unit 118, an oscillator 119, a control unit 120, a display unit 132, and an audio output unit 134. In addition, the control unit 120 is constituted to include an operation setting unit 121, a reproduction control unit 122, a counter 124, a counter value return unit 126, and a frequency control unit 128.

The communication unit 112 is a communication interface which may be a communication device or the like for performing data communication with an external device through a network. The communication unit 112 transmits and receives a variety of data to and from the content server 20 or another reproduction apparatus 100 through the network based on control by the control unit 120.

The communication unit 112 can receive from the content server 20 the content list that lists contents that the content server 20 can provide and attribute information of the contents, the communication unit 112 can transmit to the content server 20 a transmission request of content desired by the user from among the content list, and the communication unit 112 can receive the uncompressed content data that is streamed from the content server 20. Moreover, the communication unit 112 can also transmit to and receive from the other reproduction apparatus 100, via the LAN 11, a variety of information related to content reproduction control (e.g., synchronous reproduction control) between the reproduction apparatus 100a and the plurality of the reproduction apparatus 100. The content reproduction control between the reproduction apparatus 100a and the other reproduction apparatus 100 will be described in detail below.

The recording unit 114 stores therein a variety of data and mainly stores therein information which is held even when the reproduction apparatus 100a is turned off. The recording unit 114 may be a flash memory, for example. The recording unit 114 stores therein, for example, content data that is obtained from the content server 20 or that is directly stored by the user, and information for identifying the reproduction apparatus 100a (e.g., a MAC address, an UUID, a user name or the like).

The storage unit 115 stores therein a variety of information and mainly stores therein information to be temporarily used. The storage unit 115 may be a SDRAM, a SRAM, a DRAM, an RDRAM or the like. The storage unit 115 temporarily stores therein data to be transmitted from the communication unit 112 before the transmission or temporarily stores therein data that has been received by the communication unit 112.

The content reproduction unit 116 reproduces content stored in the recording unit 114 or provided from the content server 20. The content reproduced by the content reproduction unit 116 is displayed on the display unit 132 or is output from the audio output unit 134. The reproduction of the content in the content reproduction unit 116 is controlled by the reproduction control unit 122 included in the control unit 120 described below.

The content transmission unit 117 transmits the content data to the reproduction apparatus 100b, 100c, and 100d in order that the reproduction apparatus 100a and the reproduction apparatus 100b, 100c, and 100d reproduce the same content in the same timing. The transmission processing by the content transmission unit 117 may be performed by the reproduction control unit 122, for example.

The input unit 118 may be, for example, an operation key such as a touch panel, a button, a switch, a lever or a dial, or alternatively, may include an operation device including a remote controller and an optical receiver for the remote controller and an input control circuit for generating an input signal in response to a user's input operation to the operation device and outputting the input signal to the control unit 120. By operating the input unit 118, the user of the reproduction apparatus 100a can input a variety of data into and can give an instruction of processing operation to the reproduction apparatus 100a. Examples of the instruction according to the user's input operation include a selection instruction of the content server 20 from which the content is to be obtained, a selection instruction of selecting from the content list content to be reproduced, a reproduction control instruction controlling playback such as playback/pausing/fast-forwarding/rewinding/volume control of the content, a selection instruction of the reproduction mode, a synchronous reproduction instruction for selecting a reproduction control mode, a synchronous reproduction termination instruction, and a setting instruction for turning on/off a synchronous reproduction function.

The oscillator 119 oscillates at a predetermined sampling frequency fs, generates a clock and outputs the clock. The clock from the oscillator 119 is sent to the control unit 120 and becomes the basis of a variety of operations. Specifically, the value of the counter 124 described below is increased in response to the clock from the oscillator 119.

The display unit 132 may be a display apparatus such as a liquid crystal display (LCD), for example. In the case where the content reproduced by the content reproduction unit 116 is video content, the display unit 132 can display the video. The display unit 132 can display the content list, the attribute information of the content, the state of reproduction such as reproduction elapsed time and the like that have been received from the content server 20. The user can select desired content data based on the display of the content list. Moreover, regarding the synchronous reproduction function among the reproduction apparatus 100, the display unit 132 can display the identification information of the reproduction apparatus 100 which are the other parties of the synchronous reproduction. The identification information of the reproduction apparatus 100 may be a Friendly Name which is a device name assigned to each of the reproduction apparatus 100 based on the UUID, the MAC address, a user's input or the like, for example.

The audio output unit 134 outputs sound, such as a speaker, an earphone, or a head set, and can output audio data included in content when the content reproduction unit 116 reproduces the content.

The control unit 120 includes, for example, a central processing unit (CPU), ROM, RAM and the like, operates according to a variety of programs stored in the ROM or the like and controls the overall operation of the reproduction apparatus 100a. By operating according to the programs installed in the reproduction apparatus 100a, the control unit 120 can operate as the operation setting unit 121, the reproduction control unit 122, the counter 124, the counter value return unit 126, and the frequency control unit 128 as shown in FIG. 2, for example. In the following, each unit of the control unit 120 will be described.

The operation setting unit 121 sets whether to cause the reproduction apparatus 100a to operate as a master unit or to operate as a slave unit when the synchronous reproduction of content is performed in the content reproduction system 10. The operation setting unit 121 can set whether to cause the reproduction apparatus 100a to operate as a master unit or to operate as a slave unit according to an operation of the input unit 118 by the user or in response to an instruction from the content reproduction control apparatus 30.

The reproduction control unit 122 controls the reproduction of content by the content reproduction unit 116. The reproduction control unit 122 orders the content reproduction unit 116 the reproduction processing, or skipping, fast-forwarding, rewinding or the like of the content, in response to the reproduction instruction from the user by the input unit 118 or a reproduction instruction from the content reproduction control apparatus 30.

The counter 124 increases the value in response to the clock from the oscillator 119. By using the value of the counter 124, the content reproduction system 10 according to the embodiment of the present invention can cause the reproduction apparatus 100a which functions as a master unit and the reproduction apparatus 100b, 100c and 100d which function as slave units to reproduce the same content at the same time.

In response to a counter value query transmitted from the reproduction apparatus 100b, 100c and 100d which function as slave units, the counter value return unit 126 returns the value of the counter 124 in the timing of receiving the query.

The frequency control unit 128 controls the sampling frequency fs according to the sampling frequency of the content. The control of the sampling frequency fs by the frequency control unit 128 will be described in detail below.

Figure 3:
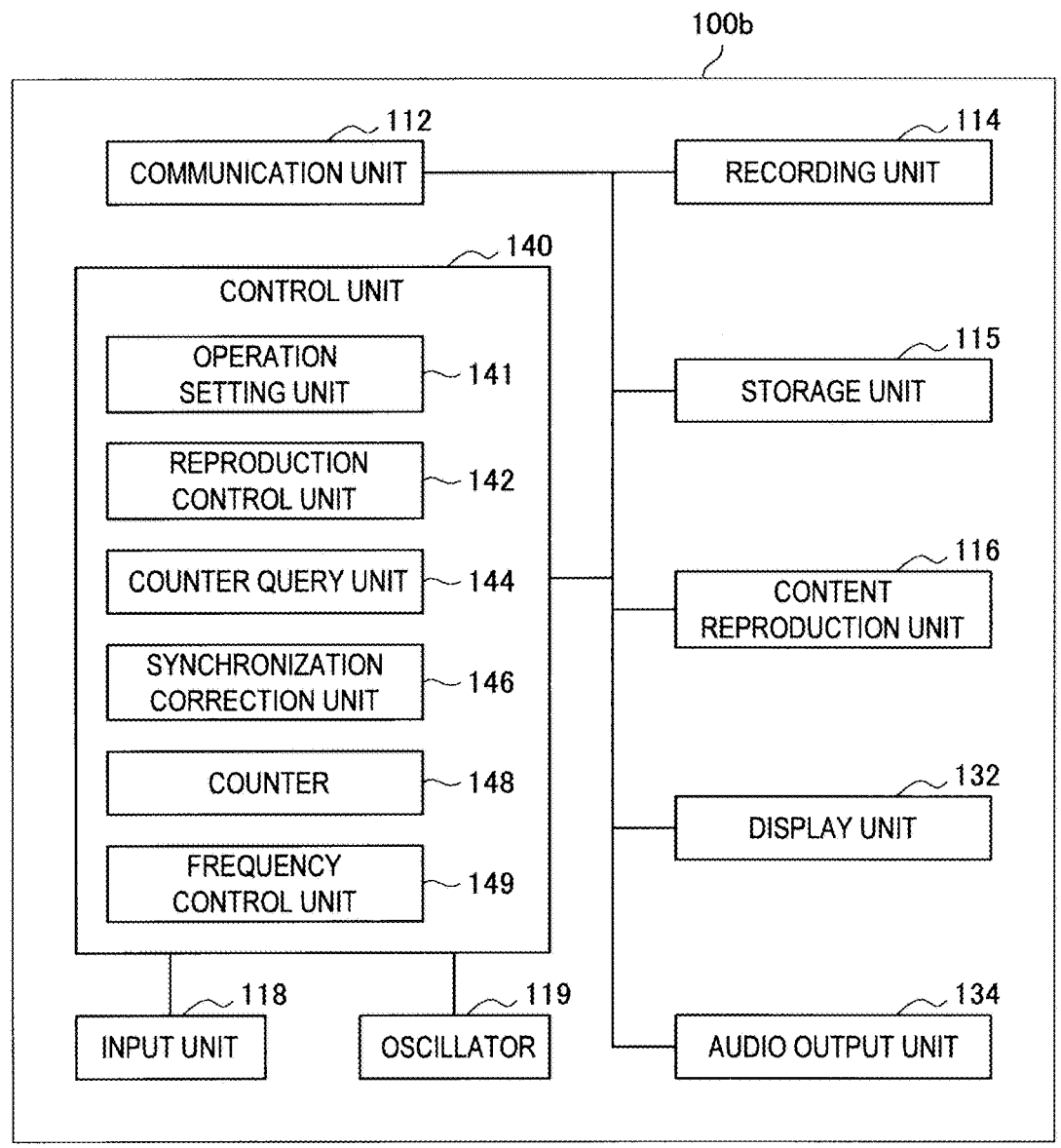
FIG. 3 is an explanatory diagram showing a configuration of a reproduction apparatus 100b which functions as a slave unit.

The configuration of the reproduction apparatus 100a according to the embodiment of the present invention has been described above. Subsequently, a configuration of the reproduction apparatus 100b which functions as a slave unit will be described. FIG. 3 is an explanatory diagram showing the configuration of the reproduction apparatus 100b which functions as a slave unit. In the following, the configuration of the reproduction apparatus 100b according to the embodiment of the present invention will be described using FIG. 3.

As shown in FIG. 3, the reproduction apparatus 100b according to the embodiment of the present invention includes the communication unit 112, the recording unit 114, the storage unit 115, the content reproduction unit 116, the input unit 118, the oscillator 119, the display unit 132, the audio output unit 134, and a control unit 140. In addition, the control unit 140 includes an operation setting unit 141, a reproduction control unit 142, a counter query unit 144, a synchronization correction unit 146, a counter 148, and a frequency control unit 149.

In the following, there will be described the control unit 140 having a different configuration from that in the reproduction apparatus 100a shown in FIG. 2.

The control unit 140 includes, in the same manner as the control unit 120 shown in FIG. 2, a central processing unit (CPU), ROM, RAM and the like, operates according to a variety of programs stored in the ROM or the like and controls the overall operation of the reproduction apparatus 100b, for example. By operating according to the programs installed in the reproduction apparatus 100b, the control unit 140 can operate as the operation setting unit 141, the reproduction control unit 142, the counter query unit 144, the synchronization correction unit 146, the counter 148, and the frequency control unit 149 as shown in FIG. 3, for example. In the following, each unit of the control unit 120 will be described.

The operation setting unit 141 sets whether to cause the reproduction apparatus 100b to operate as a master unit or to operate as a slave unit when the synchronous reproduction of content is performed in the content reproduction system 10. The operation setting unit 141 can set whether to cause the reproduction apparatus 100b to operate as a master unit or to operate as a slave unit according to an operation of the input unit 118 by the user or in response to an instruction from the content reproduction control apparatus 30.

The reproduction control unit 142 controls the reproduction of content by the content reproduction unit 116. The reproduction control unit 142 orders the content reproduction unit 116 the reproduction processing, or skipping, fast-forwarding, rewinding or the like of the content, in response to the reproduction instruction from the user by the input unit 118 or a reproduction instruction from the content reproduction control apparatus 30.

The counter query unit 144 queries the reproduction apparatus 100a which functions as a master unit for the value of the counter 124 of the reproduction apparatus 100a. The counter query unit 144 generates a packet for querying the value of the counter 124 of the reproduction apparatus 100a. The packet generated by the counter query unit 144 is transmitted from the communication unit 112 to the reproduction apparatus 100a.

The synchronization correction unit 146 corrects the value of the counter 148 based on the return of the counter value received from the reproduction apparatus 100a which functions as a master unit, thereby achieving synchronization between the reproduction apparatus 100a which functions as a master unit and the reproduction apparatus 100b which functions as a slave unit. The counter value correction processing by the synchronization correction unit 146 will be described in detail below.

The counter 148 increases the value in response to the clock from the oscillator 119. By using the value of the counter 124, the content reproduction system 10 according to the embodiment of the present invention can cause the reproduction apparatus 100a which functions as a master unit and the reproduction apparatus 100b, 100c and 100d which function as slave units to reproduce the same content at the same time.

The frequency control unit 128 controls the sampling frequency fs according to the sampling frequency of the content. The control of the sampling frequency fs by the frequency control unit 128 will be described in detail below.

The configuration of the reproduction apparatus 100*b* according to the embodiment of the present invention has been described above. In addition, although the configuration of the control unit differs between the reproduction apparatus 100*a* and the reproduction apparatus 100*b* in the above description, reproduction apparatus 100 can function as both a master unit and a slave unit. Accordingly, the reproduction apparatus 100*b* shown in FIG. 3 may be caused to function as a master unit.

[1-3. Content Reproduction Processing]

Figure 4:
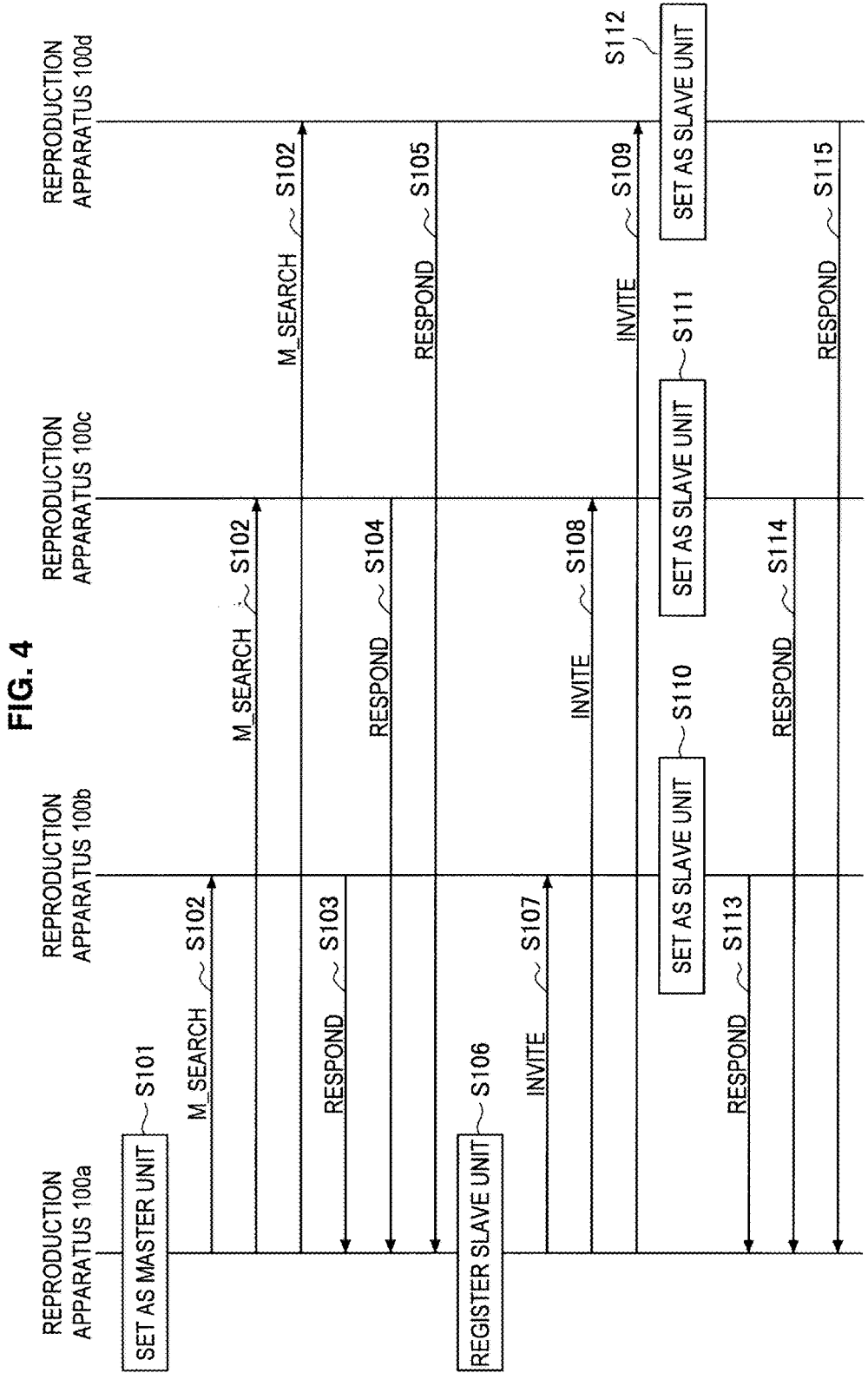
FIG. 4 is a flowchart for explaining set processing of a master unit and a slave unit in the content reproduction system 10 according to the embodiment of the present invention.

Next, content reproduction processing by the content reproduction system 10 according to the embodiment of the present invention will be described. First, when the content reproduction processing by the content reproduction system 10 according to the embodiment of the present invention starts, it is necessary to determine a reproduction apparatus which is to be a master unit and a reproduction apparatus which is to be a slave unit. FIG. 4 is a flowchart for explaining the set processing of a master unit and a slave unit in the content reproduction system 10 according to the embodiment of the present invention. In the following, the set processing of the master unit and the slave unit in the content reproduction system 10 according to the embodiment of the present invention will be described using FIG. 4.

The flowchart shown in FIG. 4 shows a case where, among the plurality of reproduction apparatus 100, an arbitrary reproduction apparatus 100*a* becomes a master unit and the other reproduction apparatus 100*b*, 100*c* and 100*d* become slave units.

In the example shown in FIG. 4, the reproduction apparatus 100*a* first sets itself as a master unit (step S101). In order to set the reproduction apparatus 100*a* as a master unit, the user may set the reproduction apparatus 100*a* as a master unit by operating the input unit 118 of the reproduction apparatus 100*a* and in the case where there is the content reproduction apparatus 30, the content reproduction apparatus 30 may transmit an instruction to the reproduction apparatus 100*a* to function as a master unit, for example, but here is shown the case where the user sets the reproduction apparatus 100*a* as a master unit by operating the input unit 118 of the reproduction apparatus 100*a*.

When the reproduction apparatus 100*a* is set as a master unit, a device presence confirmation request (M_SEARCH method) is multicasted from the reproduction apparatus 100*a* which is set as a master unit (step S102). Each of the reproduction apparatus 100*b*, 100*c* and 100*d* which have received the presence confirmation request from the reproduction apparatus 100*a* returns a response to the reproduction apparatus 100*a* (steps S103, S104, and S105). The reproduction apparatus 100*a* which has received the responses from the reproduction apparatus 100*b*, 100*c* and 100*d* registers as slave units the reproduction apparatus 100*b*, 100*c* and 100*d* which have returned the responses (step S106).

The reproduction apparatus 100*a* which has registered the reproduction apparatus 100*b*, 100*c* and 100*d* as slave units multicasts to the reproduction apparatus 100*b*, 100*c* and 100*d* a command (invite command) for inviting to the synchronous reproduction of content (steps S107, S108, and S109). Each of the reproduction apparatus 100*b*, 100*c* and 100*d* which have received the invite command from the reproduction apparatus 100*a* registers itself as a slave unit of the reproduction apparatus 100*a* (step S110, S111, S112). Each of the reproduction apparatus 100*b*, 100*c* and 100*d* which have been registered as slave units of the reproduction apparatus 100*a* returns, to the reproduction apparatus 100*a*, a command for notifying the reproduction apparatus 100*a* of the completion of the registration as a slave unit (step S113, S114, and S115). By receiving the replies from the reproduction apparatus 100*b*, 100*c* and 100*d*, the reproduction apparatus 100*a* can recognize that the reproduction apparatus 100*b*, 100*c* and 100*d* have been set as slave units. After this, content is multicasted from the reproduction processing apparatus 100*a* which functions as a master unit to the reproduction apparatus 100*b*, 100*c* and 100*d* which function as slave units, thereby the synchronous reproduction of the content can be performed.

Figure 5:
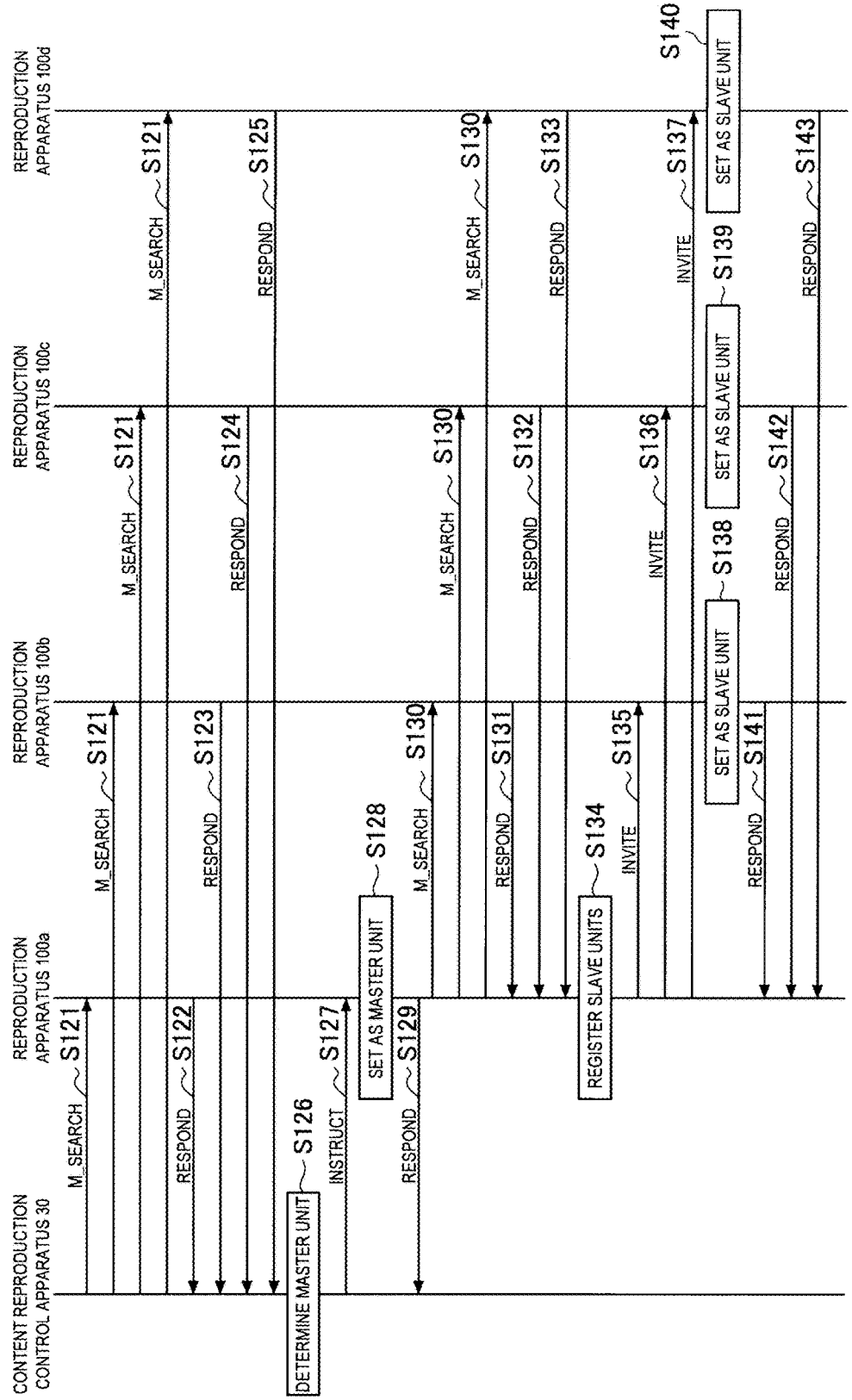
FIG. 5 is a flowchart for explaining a different example of the set processing of a master unit and a slave unit in the content reproduction system 10 according to the embodiment of the present invention.

The set processing of the master unit and the slave unit in the content reproduction system 10 according to the embodiment of the present invention has been described above using FIG. 4. Although in FIG. 4, there is shown the case where the arbitrary reproduction apparatus 100*a* becomes a master unit and the other reproduction apparatus 100*b*, 100*c* and 100*d* become slave units among the plurality of reproduction apparatus 100, the present invention is not limited to such example. For example, the content reproduction control apparatus 30 shown in FIG. 1 may set, among the plurality of reproduction apparatus, an arbitrary reproduction apparatus 100*a* as a master unit and the reproduction apparatus 100*a* which has become a master unit may set the other reproduction apparatus 100*b*, 100*c*, 100*d* and etc. as slave units. FIG. 5 is a flowchart for explaining a different example of the set processing of a master unit and a slave unit in the content reproduction system 10 according to the embodiment of the present invention.

The flowchart shown in FIG. 5 shows a case where the content reproduction control apparatus 30 sets among the plurality of reproduction apparatus, an arbitrary reproduction apparatus 100*a* as a master unit and the reproduction apparatus 100*a* which has become a master unit sets the other reproduction apparatus 100*b*, 100*c*, and 100*d* as slave units.

In the example shown in FIG. 5, the content reproduction control apparatus 30 first multicasts a device presence confirmation request (M_SEARCH method) (step S121). Each of the reproduction apparatus 100*a*, 100*b*, 100*c* and 100*d* which have received the presence confirmation request transmitted from the content reproduction control apparatus 30 returns a response command to the content reproduction control apparatus 30 (steps S122, S123, S124, and S125). The response command is generated in the control units 120 and 140, for example. The generated response command is transmitted from the communication unit 112.

The content reproduction control apparatus 30 which has received the response command from the reproduction apparatus 100*a*, 100*b*, 100*c* and 100*d* designates one of the reproduction apparatus which have returned the response command as a master unit (step S126). In the example shown in FIG. 5, the content reproduction control apparatus 30 designates the reproduction apparatus 100*a* as a master unit from among the reproduction apparatus which have returned the response command. The content reproduction control apparatus 30 which has determined to designate the reproduction apparatus 100*a* as a master unit transmits to the reproduction apparatus 100*a* a command for instructing to function as a master unit (step S127). The reproduction apparatus 100*a* which has received the instruction command transmitted from the content reproduction control apparatus 30 sets itself as a master unit (step S128) and responds to the content reproduction control apparatus 30 that the reproduction apparatus 100*a* has set itself as a master unit (step S129). The setting of the reproduction apparatus 100a to be a master unit is performed by the operation setting unit 121 included in the control unit 120, for example.

The reproduction apparatus 100a which has been set to function as a master unit subsequently multicasts a device presence confirmation request (M_SEARCH method) in the same manner as the example shown in FIG. 4 (step S130). The device presence confirmation request is generated by the control unit 120, for example. The generated device presence confirmation request is transmitted from the communication unit 112. Each of the reproduction apparatus 100b, 100c and 100d which have received the presence confirmation request returns a response to the reproduction apparatus 100a (steps S131, S132, and S133). A response packet to the reproduction apparatus 100a is generated by the control unit 140, for example. The generated response packet is transmitted from the communication unit 112. The reproduction apparatus 100a which has received the response from the reproduction apparatus 100b, 100c and 100d registers as slave units the reproduction apparatus 100b, 100c and 100d which has returned the response (step S134). The setting of the reproduction apparatus 100b, 100c and 100d to be slave units is performed by the operation setting unit 141 included in the control unit 140, for example.

The reproduction apparatus 100a which has registered the reproduction apparatus 100b, 100c and 100d as slave units, multicasts to the reproduction apparatus 100b, 100c and 100d a command (invite command) for inviting to the synchronous reproduction of content (steps S135, S136, and S137). Each of the reproduction apparatus 100b, 100c and 100d which have received the invite command from the reproduction apparatus 100a registers itself as a slave unit of the reproduction apparatus 100a (steps S138, S139, and S140). Each of the reproduction apparatus 100b, 100c and 100d which have been registered as slave units of the reproduction apparatus 100a returns, to the reproduction apparatus 100a, a command for notifying the reproduction apparatus 100a of the completion of the registration as a slave unit (step S141, S142, and S143). By receiving the replies from the reproduction apparatus 100b, 100c and 100d, the reproduction apparatus 100a can recognize that the reproduction apparatus 100b, 100c and 100d have been set as slave units. After this, content is multicasted from the reproduction processing apparatus 100a which functions as a master unit to the reproduction apparatus 100b, 100c and 100d which function as slave units, thereby the synchronous reproduction of the content can be performed.

The different example of the set processing of the master unit and the slave unit in the content reproduction system 10 according to the embodiment of the present invention has been described above. In this manner, it is prepared to cause the slave units to reproduce the same content as that reproduced in the master unit in the same timing in the content reproduction system 10 according to the embodiment of the present invention, by determining the reproduction apparatus which is to be the master unit and the reproduction apparatus which is to be the slave units.

Figure 6:
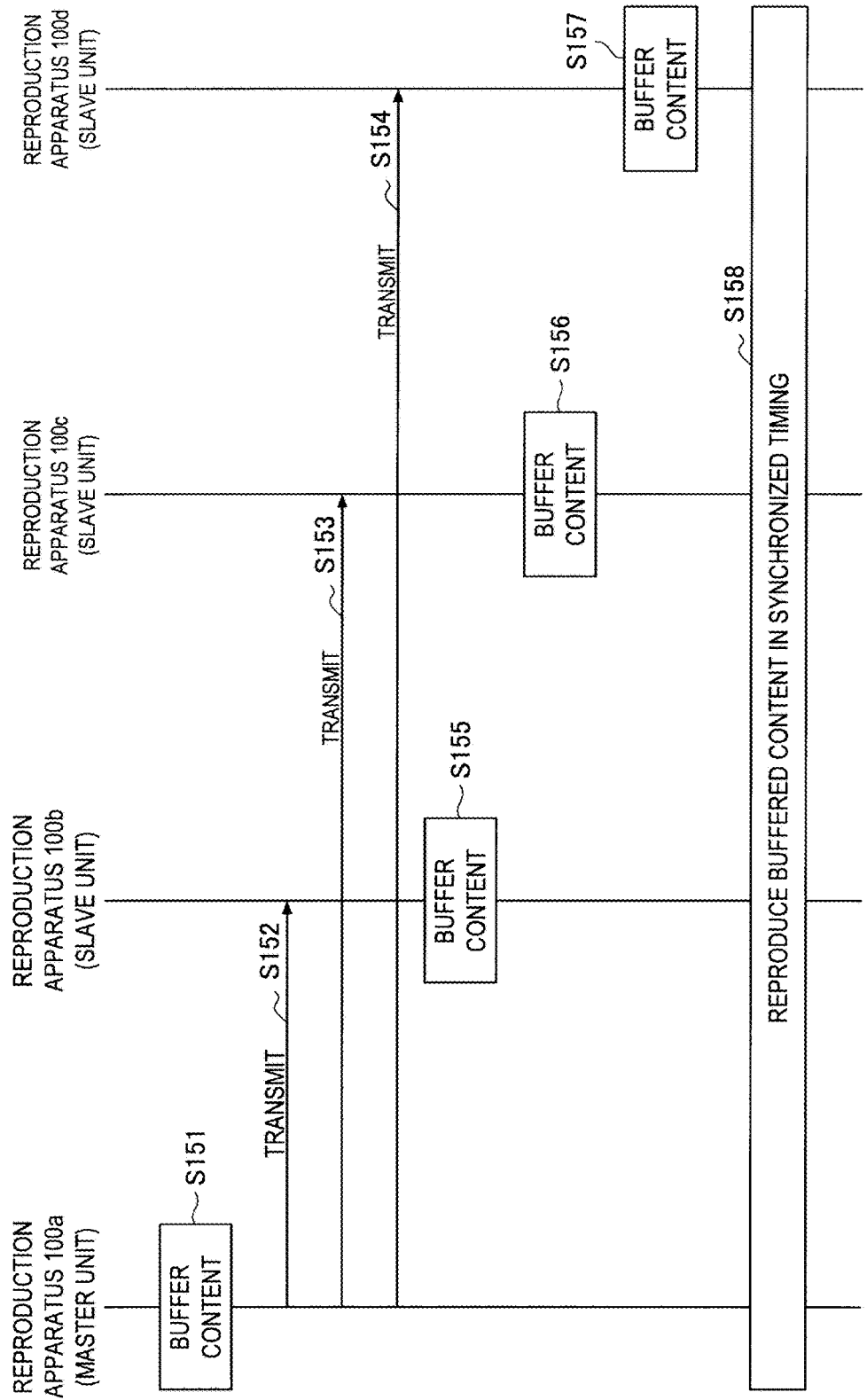
FIG. 6 is a flowchart showing an outline of content reproduction processing in the content reproduction system 10 according to the embodiment of the present invention.

FIG. 6 is a flowchart showing an outline of content reproduction processing in the content reproduction system 10 according to the embodiment of the present invention. In the following, the outline of the content reproduction processing in the content reproduction system 10 according to the embodiment of the present invention will be described using FIG. 6.

FIG. 6 shows, as an example, a case where the reproduction apparatus 100a functions as a master unit and the reproduction apparatus 100b, 100c and 100d function as slave units. The reproduction apparatus 100a which functions as a master unit buffers in the storage unit 115 content data to be reproduced (step S151). Then, the content buffered in the storage unit 115 is transmitted from the reproduction apparatus 100a by the communication unit 112 to the reproduction apparatus 100b, 100c and 100d which function as slave units at a predetermined timing (steps S152, S153, and S154). In the present embodiment, the reproduction apparatus 100a transmits the content to the reproduction apparatus 100b, 100c and 100d in the form of a UDP packet. The packet transmitted from the reproduction apparatus 100a includes, in addition to the content data, information on the time when the content data should be reproduced. When the content is reproduced, reproduction timing is determined by referring to the time information, thereby enabling the plurality of the reproduction apparatus 100 to synchronize the reproduction of the content.

Each of the reproduction apparatus 100b, 100c and 100d which have received the packet including the content data from the reproduction apparatus 100a by the communication unit 112 buffers the received content data in the storage unit 115 (steps S155, S156, and S157). Then, each of the reproduction apparatus 100a, 100b, 100c and 100d refers to the value of the counter held within (the control unit of) its own reproduction apparatus and the information on the time when the content data should be reproduced, and reproduces the content in synchronization with each other when the timing for reproduction comes (step S158).

The outline of the content reproduction processing in the content reproduction system 10 according to the embodiment of the present invention has been described above. In this manner, the content is transmitted from the master unit to the slave units and is reproduced by synchronizing the reproduction between the master unit and the slave units, and thereby the master unit and the slave units can reproduce the same content in the same timing.

Here, if the reproduction apparatus which functions as a master unit and the reproduction apparatus which functions as a slave unit include exactly the same sampling frequency, and the reproduction of the content is synchronized between the master unit and the slave unit, a gap in reproduction position of the content will not occur thereafter. However, the oscillator mounted on each of the reproduction apparatus may have a variation in oscillating frequency of about a few tens of ppm. When the oscillator having a variable oscillating frequency is used in this manner, and the content is reproduced for a long time, there may occur a gap in reproduction position between the master unit and the slave unit or between the slave units. Accordingly, in order to synchronize the reproduction of the content among the plurality of the reproduction apparatus, it is necessary to synchronize the sampling frequency among the reproduction apparatus which reproduce the same content.

Accordingly, in the present embodiment, the sampling frequencies of all the slave units which have received the content from the master unit are synchronized with the sampling frequency of the master unit, and thereby synchronizing the sampling frequency among the reproduction apparatus which reproduce the same content. In addition, in order to synchronize the sampling frequency, the slave unit queries the master unit for the value of the counter held by the master unit on a regular basis and the value of the counter of the slave unit is corrected by using the value of the counter of the master unit, thereby synchronizing the sampling frequency among the reproduction apparatus which reproduce the same content.

[1-4. Sampling Frequency Synchronization Processing]

Figure 7:
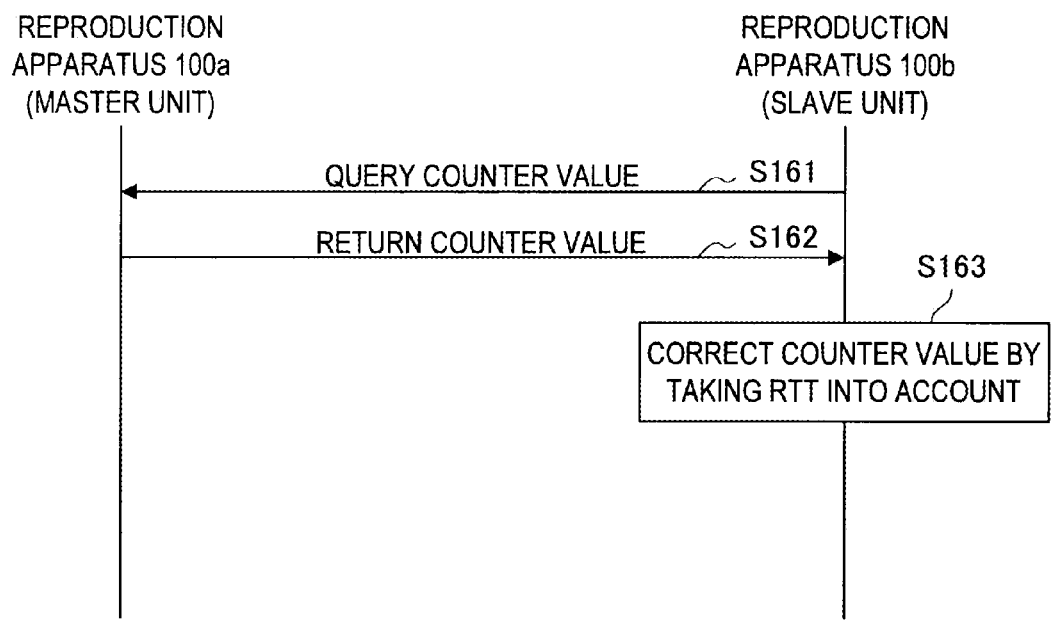
FIG. 7 is a flowchart showing sampling frequency synchronization processing between a reproduction apparatus which is a master unit and a reproduction apparatus which is a slave unit according to the embodiment of the present invention.

FIG. 7 is a flowchart showing the sampling frequency synchronization processing between the reproduction apparatus which is a master unit and the reproduction apparatus which is a slave unit according to the embodiment of the present invention. In the following, the sampling frequency synchronization processing between the reproduction apparatus which is a master unit and the reproduction apparatus which is a slave unit according to the embodiment of the present invention will be described using FIG. 7. In addition in FIG. 7, there is described the sampling frequency synchronization processing between the reproduction apparatus 100a which is a master unit and the reproduction apparatus 100b which is a slave unit for the convenience of the description.

In order to synchronize the sampling frequency of the reproduction apparatus 100b which is a slave unit with the sampling frequency of the reproduction apparatus 100a which is a master unit, the reproduction apparatus 100b queries the reproduction apparatus 100a for the counter value of the reproduction apparatus 100a on a regular basis (step S161). The query processing of the counter value is performed by the counter value query unit 144. The query processing of the counter value of the reproduction apparatus 100a may be performed by the counter value query unit 144 generating a packet for querying the counter value and transmitting the query packet from the communication unit 112, for example.

The reproduction apparatus 100a which has received the query for the counter value returns the counter value of its own counter 124 to the reproduction apparatus 100b which has transmitted the query (step S162). The return of the counter value of the counter 124 is performed by the counter value return unit 126. The return of the counter value of the counter 124 may be performed by generating a return packet in the counter value return unit 126 and transmitting the return packet from the communication unit 112, for example. When the reproduction apparatus 100b receives the return of the counter value of the reproduction apparatus 100a, the reproduction apparatus 100b corrects the counter value of the counter 148 of the reproduction apparatus 100b by using the received counter value of the reproduction apparatus 100a (step S163). The correction of the counter value of the counter 148 is performed by the synchronization correction unit 146.

When correcting the counter value of the counter 148, the synchronization correction unit 146 takes into account RTT (Round Trip Time) of the query packet transmitted from the reproduction apparatus 100b to the reproduction apparatus 100a. Concerning the RTT of the query packet, when the synchronization correction unit 146 transmits the query packet from the reproduction apparatus 100b, the synchronization correction unit 146 may calculate the RTT by using the time it generated the query packet and the time it received the return packet from the reproduction apparatus 100a, for example.

In addition, in wired LAN, RTT is usually less than 1 ms, but in wireless LAN, especially in the case of 802.11b, RTT is about a few ms. Furthermore, in wireless LAN, there may occur an extreme packet delay by retransmission processing of the packet, and furthermore, there is often a case that the packet delay occurs only in one direction. Accordingly, in the case where the RTT exceeds a predetermined time, it is acceptable to repeatedly measure the RTT for several times until a small value can be stably obtained, instead of directly correcting a half of the RTT as a transmission delay.

Figure 8:
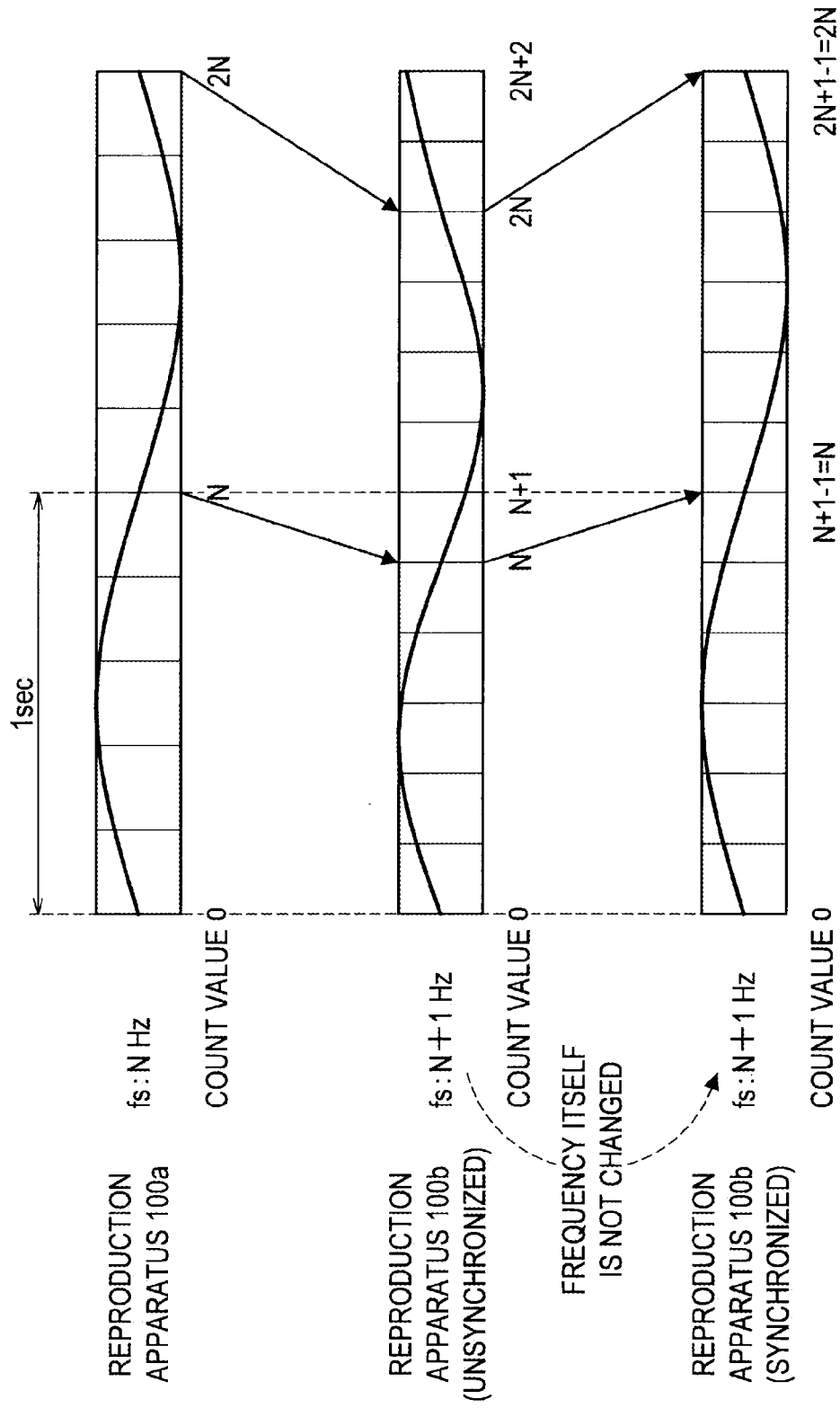
FIG. 8 is an explanatory diagram schematically showing the sampling frequency synchronization processing between the reproduction apparatus which is a master unit and the reproduction apparatus which is a slave unit according to the embodiment of the present invention.

FIG. 8 is an explanatory diagram schematically showing the sampling frequency synchronization processing between the reproduction apparatus which is a master unit and the reproduction apparatus which is a slave unit according to the embodiment of the present invention. In FIG. 8, the sampling frequency fs of the reproduction apparatus 100a which functions as a master unit is N [Hz], and the sampling frequency fs of the reproduction apparatus 100b which functions as a slave unit is N+1 [Hz]. That is, in the reproduction apparatus 100a, the value of the counter 124 by N per second, and in the reproduction apparatus 100b, the value of the counter 148 increases by N+1 per second. Accordingly, if the reproduction apparatus 100b directly reproduces the content which is reproduced at the sampling frequency of N [Hz], the sample number of the content which is the reproduction object is greater than the reproduction processing apparatus 100a, so that the content reproduction is speeded up and thus there occurs a gap in the content reproduction timing with the reproduction apparatus 100a.

Accordingly, in the present embodiment, instead of the sampling frequency itself of the reproduction apparatus 100b which functions as a slave unit being changed, the sample number N per second is increased to N+1, and the value of the counter 148 is reduced by one count. These processing is performed by the synchronization correction unit 146 included in the control unit 140. By increasing the sample number per second, the sampling frequency of the reproduction apparatus 100b becomes N [Hz] in appearance and becomes possible to be synchronized with the sampling frequency of the reproduction apparatus 100a.

In addition, when the sample number N per second is increased to N+1 in the reproduction apparatus 100b, the Nth sample may directly be the N+1th sample, or the N+1th sample may be generated by interpolation (e.g., linear interpolation) t by using the samples preceding and following the N+1th sample. Especially, by generating and reproducing the N+1th sample by the interpolation by using the samples preceding and following the N+1th sample, the content can be listened to by a listener of the content without a sense of discomfort.

Moreover, also when the sample number N per second is reduced to N−1, the Nth sample may be simply subtracted, or the reduction of the sample number may be realized by using the samples preceding and following the Nth sample and interpolating it. In addition, at the time of the interpolation processing, division processing may be performed, and the division processing may be substituted by shift operation processing.

In the reproduction processing apparatus 100b, when the sampling frequency is adjusted, the sampling frequency may be synchronized with that of the reproduction processing apparatus 100a in one correction processing or may be gradually synchronized with that of the reproduction processing apparatus 100a by repeating the correction processing for multiple times. The difference between the sampling frequency of the reproduction apparatus 100a and that of the reproduction apparatus 100b mainly includes an offset error which was unable to be corrected by the correction processing, and a difference (fs deviation) in the sampling frequency which occurs during one adjustment period. An example of other factors is a disturbance due to a measurement error of the RTT, a count extrapolation error or the like. Among these, the offset error may be corrected during the following adjustment period, and the fs deviation may be corrected per period.

Figure 9:
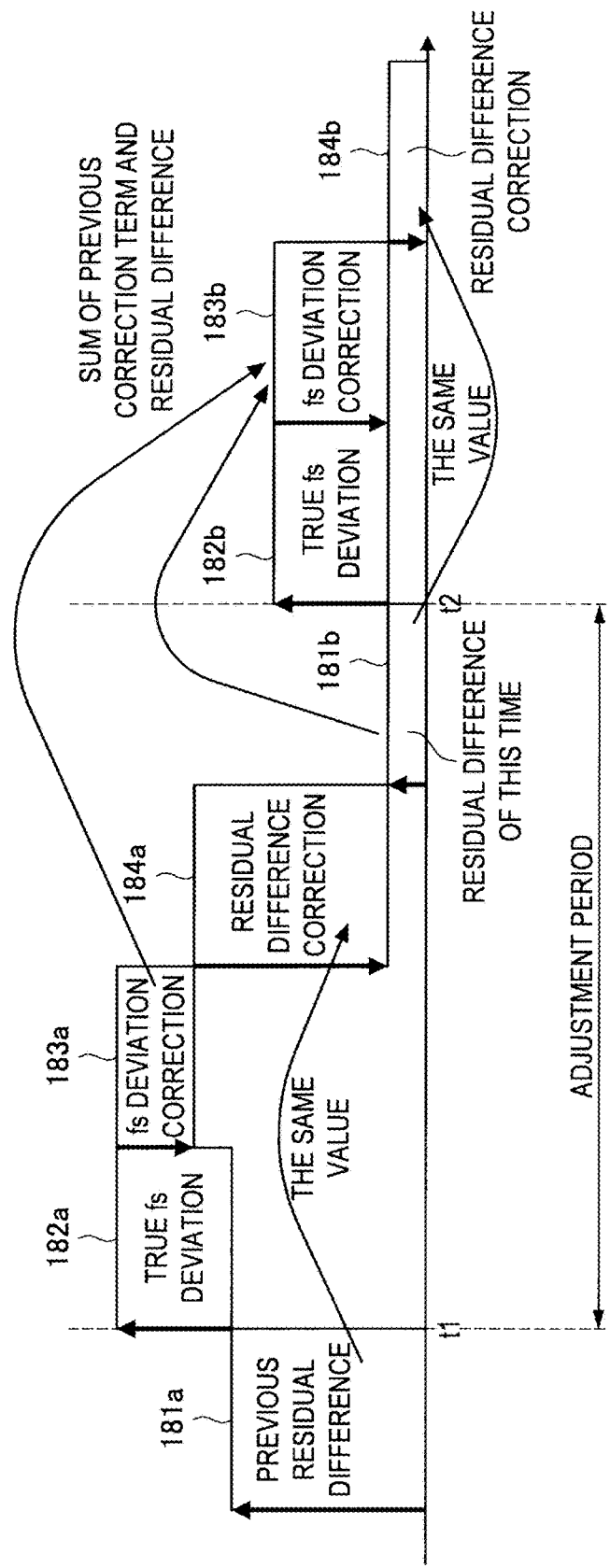
FIG. 9 is an explanatory diagram schematically showing sampling frequency adjustment processing of the reproduction apparatus 100b according to the embodiment of the present invention.

FIG. 9 is an explanatory diagram schematically showing sampling frequency adjustment processing of the reproduction apparatus 100b according to the embodiment of the present invention. The reference numeral 181a in FIG. 9 shows a difference (residual difference) in the sampling frequency with the reproduction apparatus 100a remained before the sampling frequency adjustment processing. Moreover, the reference numeral 182a in FIG. 9 shows a difference (true fs deviation) in the sampling frequency between the reproduction apparatus 100a and the reproduction apparatus 100b occurred during one adjustment period. Then, the reference numeral 183a shows the correction amount of the fs deviation corrected in one adjustment processing, and the reference numeral 184a shows the correction amount of the residual difference before the sampling frequency adjustment processing was performed. Accordingly, the amount of the residual difference shown by the reference numeral 181a and the correction amount of the residual difference shown by the reference numeral 184a are the same amount. In addition, the reference numeral 181b shows a difference (residual difference) in the sampling frequency with the reproduction apparatus 100a remained after the sampling frequency adjustment processing is performed.

Moreover, the reference numeral 182b in FIG. 9 shows a difference (true fs deviation) in the sampling frequency between the reproduction apparatus 100a and the reproduction apparatus 100b occurred during one adjustment period. Accordingly, if the adjustment period does not change, the true fs deviation shown by the reference numeral 182a and that shown by the reference numeral 182b are the same amount. In addition, the reference numeral 183b in FIG. 9 shows the correction amount of the fs deviation corrected in one adjustment processing. The correction amount shown by the reference numeral 183b corresponds to the result of addition of the previous correction amount of the fs deviation shown by the reference numeral 183a and the difference (residual difference) in the sampling frequency with the reproduction apparatus 100a shown by the reference numeral 181b. In addition, the reference numeral 184b shows the correction amount of the residual difference before the sampling frequency adjustment processing was performed. The correction amount shown by the reference numeral 184b shows the difference (residual difference) in the sampling frequency of the reproduction apparatus 100a shown by the reference numeral 181b.

In this manner, not by synchronizing the sampling frequency of the reproduction apparatus 100b with that of the reproduction apparatus 100a in one correction processing, but by synchronizing the sampling frequency of the reproduction apparatus 100b with that of the reproduction apparatus 100a by the repetition of the correction processing for multiple times, the content can be stably reproduced by the reproduction apparatus 100b.

[1-5. Content Transmission Processing]

As described above, by regularly performing the processing of synchronizing the sampling frequency of the reproduction apparatus 100b with that of the reproduction apparatus 100a, the reproduction apparatus 100a and the reproduction apparatus 100b can reproduce the same content in the same timing, and in addition, in the manner so as not to create a gap in the reproduction timing. Subsequently, content transmission processing from the reproduction apparatus 100a to the reproduction apparatus 100b in the content reproduction system 10 according to the embodiment of the present invention will be described.

Figure 10:
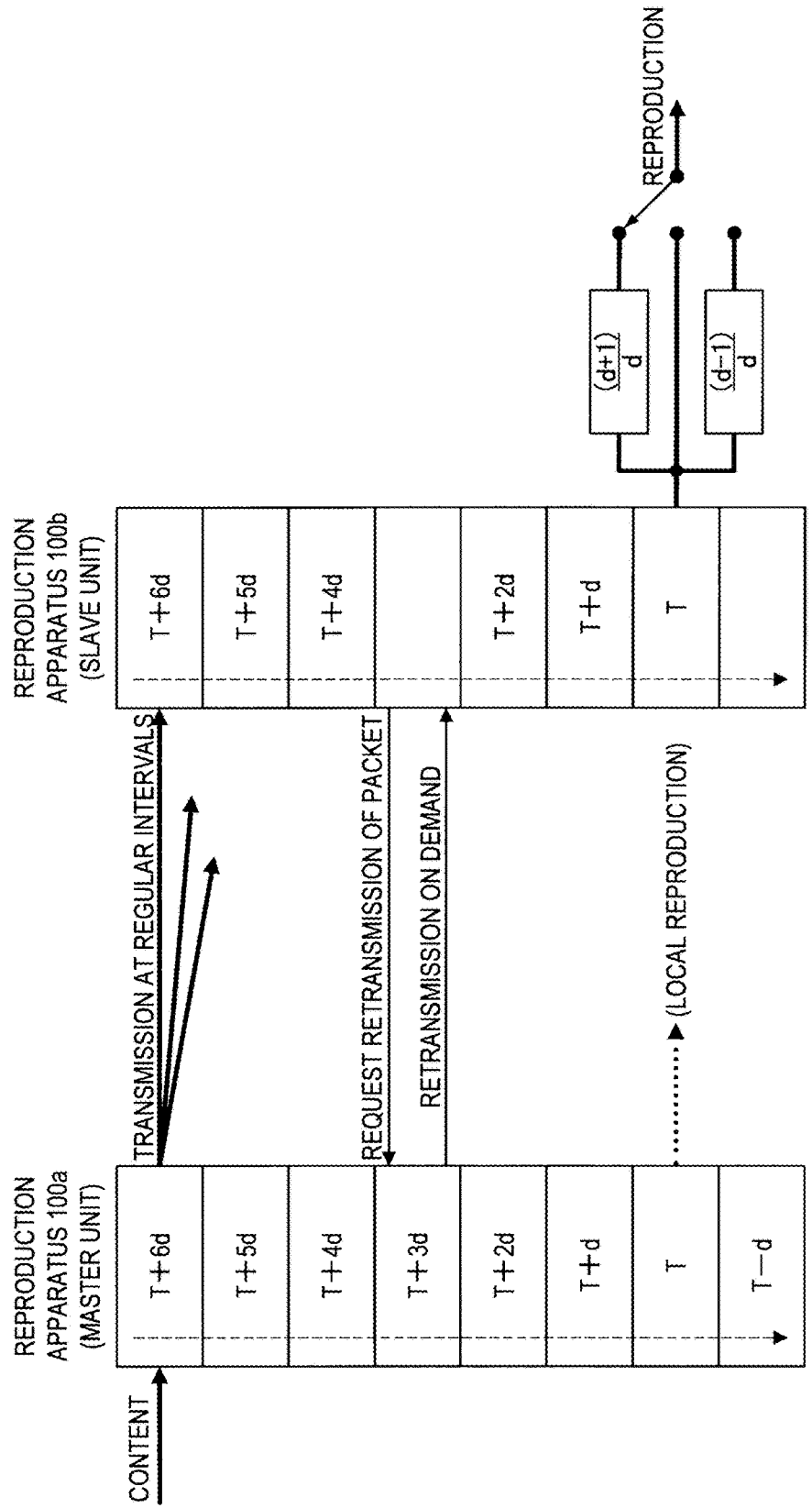
FIG. 10 is an explanatory diagram schematically showing content transmission processing from the reproduction apparatus 100a to the reproduction apparatus 100b in the content reproduction system 10 according to the embodiment of the present invention.

FIG. 10 is an explanatory diagram schematically showing the content transmission processing from the reproduction apparatus 100a to the reproduction apparatus 100b in the content reproduction system 10 according to the embodiment of the present invention. In the following, the content transmission processing from the reproduction apparatus 100a to the reproduction apparatus 100b will be described using FIG. 10. In FIG. 10, T means the numerical value indicating the time, and d means the numerical value indicating the time of one packet. One packet is generated per sample of the content and is transmitted from the master unit side to the slave unit side.

In the content reproduction system 10 according to the embodiment of the present invention, UDP (User Datagram Protocol) Unicast is used for the transmission of the content. In addition, the packet transmitted from the reproduction apparatus 100a to the reproduction apparatus 100b includes a sequence number, a time stamp, and data of the content to be reproduced (also referred to as "content data" hereinafter). The sequence number is used for detecting the presence or absence of packet loss. Moreover, the sample count value of the content is described in the time stamp and is used for the synchronous reproduction in the reproduction apparatus 100a and the reproduction apparatus 100b. The data of the content to be reproduced may be LPCM data, for example.

The reproduction apparatus 100a which functions as a master unit temporarily stores the content data in the storage unit 115 as well as transmits the packet including the content data to the reproduction apparatus 100b by the content transmission unit 117. The content data temporarily stored in the storage unit 115 is processed in FIFO (First-In First-Out) manner. The input speed and extraction speed of the content data into and from the storage unit 115 are synchronized with its own sampling frequency fs. When having received the packet including the content data from the reproduction apparatus 100a, the reproduction apparatus 100b temporarily stores the received packet in the storage unit 115. The reproduction apparatus 100b confirms the sequence number included in the received packet and in the case where packet loss occurs, the reproduction apparatus 100b requests the reproduction apparatus 100a to retransmit the packet. The reproduction apparatus 100a which has received the retransmission request of the packet from the reproduction apparatus 100b extracts the packet to be retransmitted from the storage unit 115 and retransmits it to the reproduction apparatus 100b.

For retransmission control of the packet, in the reproduction apparatus 100a, the packet to be retransmitted in response to the retransmission request of the packet may be attached with a flag indicating that it is transmitted in response to the request. Moreover, the reproduction apparatus 100a may intentionally stop the transmission in the case where the content is music data and the content is silent, or at a break in the content. In the case of intentionally stopping the transmission, it is desirable to transmit the packet by attaching a flag (pause flag) indicating a stop of the transmission. On the other hand, when the reproduction apparatus 100b which is a slave unit side has not received the packet attached with the pause flag, and at the same time, the following packet does not come after a predetermined time has elapsed, it is desirable for the reproduction apparatus 100b to request retransmission of the packet.

Then, when each counter of the reproduction apparatus 100a and the reproduction apparatus 100b corresponds to the time stamp of the packet stored in the storage unit 115, the content reproduction unit 116 extracts the content data stored in the storage unit 115 and reproduces the content. In the example shown in FIG. 10, the data including the time stamp corresponding to the current time T is read out from the storage unit 115 and is reproduced in both the reproduction apparatus 100a and the reproduction apparatus 100b. In this manner, by controlling the temporal storage and the transmission of the content data, the reproduction apparatus 100a and the reproduction apparatus 100b can reproduce the same content in the same timing.

In addition, in the reproduction apparatus 100b which functions as a slave unit, in the case where it is necessary to increase or decrease the sample number in the sampling frequency synchronization processing described above, correction processing is performed by using the samples preceding and following the target sample. In FIG. 10, samples shown by (d−1)/d and (d+1)/d correspond to the samples used for the correction processing.

In addition, it is desirable to secure about 300 to 500 [ms] of buffer depth in the reproduction apparatus 100a, although depending on the communication status. The deeper the buffer depth is, the more room to retransmit the packet occurs, so that a possibility that the reproduction of content is interrupted on the slave unit side decreases, and thereby the content can be stably reproduced. On the other hand, time required for storing the content in a buffer and then reproducing the content increases, and moreover, it costs a lot of money since enough capacity to secure the buffer depth is necessary for the storage unit 115. Accordingly, it is desirable to set the buffer depth to an appropriate value by taking into account the stable reproduction of content and the necessary cost. Moreover, the buffer depth may be dynamically changed according to the communication status or the quality such as bit rate of the content to be reproduced.

In this manner, by transmitting the content from the reproduction apparatus 100a which functions as a master unit to the reproduction apparatus 100b which functions as a slave unit, the reproduction apparatus 100a and the reproduction apparatus 100b can synchronously reproduce the same content. In addition, volume control of the content may be independently performed in the reproduction apparatus 100a and the reproduction apparatus 100b, or audio output in the reproduction apparatus 100b may be controlled following the control in the reproduction apparatus 100a which is a master unit. Moreover, by stopping the output of the content in the reproduction apparatus 100a which is a master unit and stopping the transmission of the content from the reproduction apparatus 100a to the reproduction apparatus 100b, the output of the content can be simultaneously stopped in both the master unit and the slave unit.

[1-6. Frequency Adjustment Processing on Content]

Some contents have different sampling rates. In the content reproduction system 10 according to the present embodiment, when the contents with different sampling rates are successively reproduced, there is a method of converting the contents to the same sampling rate by a SRC (Sampling Rate Convertor) in the reproduction apparatus 100a which functions as a master unit and transmitting them to the slave unit. In this method, all the processing is performed within the master unit, so that no communication is performed with the slave unit, and moreover, continuity of reproduction between the contents increases. However, in this method, there is an issue that a load of the SRC in the master unit is great.

Accordingly, in the content reproduction system 10 according to the present embodiment, the sampling frequency for increasing the counter value is sequentially switched on the master unit side, along with the change in the sampling rate of the content. Then, on the salve unit side, when the change in the sampling frequency is detected on the master unit side, the sampling frequency is switched also on the salve unit side. By changing the sampling frequency in this manner, the content can be simultaneously reproduced at an appropriate sampling frequency without imposing a load on the master unit even if the sampling rate of the content changes.

FIG. 11 is a flowchart showing the frequency adjustment processing on content in the content reproduction system 10 according to the embodiment of the present invention. In the following, the frequency adjustment processing on content in the content reproduction system 10 according to the embodiment of the present invention will be described using FIG. 11.

The reproduction apparatus 100a which functions as a master unit temporarily stops the transmission of the packet to the reproduction apparatus 100b which functions as a slave unit, at the time of content switching accompanied by the change in the sampling rate (step S191). Here, the sampling rate of content before the switching is fs0 and the sampling rate of content after the switching is fs1. Although the reproduction apparatus 100a stops the transmission of the packet to the reproduction apparatus 100b, counting up of the counter 124 continues at the sampling frequency of fs0.

When the reproduction of the content whose sampling rate is fs0 is completed in the reproduction apparatus 100a, the reproduction apparatus 100a starts the counting up of the counter 124 at the sampling frequency of fs1 (step S192). The switching of the sampling frequencies in the reproduction apparatus 100a is performed by the frequency control unit 128. Here, the counting up of the counter 124 may be performed after comparing the fs0 and the fs1 and adding the value of a predetermined time (e.g., 10 seconds) to the counter 124 based on the greater one of the fs0 and the fs1. When the counting up of the counter 124 is started at the sampling frequency fs1, the reproduction apparatus 100a restarts the transmission of the content to the reproduction apparatus 100b (step S193). When the transmission of the content is restarted, the sequence numbers included in the transmitted packets are assigned sequentially after that assigned to a transmitted packet right before the transmission was stopped at the step S191.

The reproduction apparatus 100b queries the reproduction apparatus 100a for the counter value in order to synchronize the sampling frequency (step S194). The reproduction apparatus 100a returns the value of the counter 124 to the reproduction apparatus 100b in response to the query from the reproduction apparatus 100b (step S195). The reproduction apparatus 100b which has received the return of the counter value switches the setting of the oscillator 119 and switches the sampling frequency of the reproduction apparatus 100b to fs1, when the change in the sampling frequency in the reproduction apparatus 100a is detected (step S196). The switching of the sampling frequency in the reproduction apparatus 100b is performed by the frequency control unit 149. When the sampling frequency of the reproduction apparatus 100b is switched to fs1, synchronization processing with the reproduction apparatus 100a is performed at the switched sampling frequency of fs1. In addition, the content data received while the synchronization processing with the reproduction apparatus 100a is performed in the reproduction apparatus 100b is not discarded but buffered in the storage unit 115 of the reproduction apparatus 100b.

The frequency adjustment processing on content in the content reproduction system 10 according to the embodiment of the present invention has been described above using FIG. 11. In addition, in FIG. 11, the reproduction apparatus 100b detects the change in the sampling frequency by the return of the counter value, but the present invention is not limited to such example. For example, the reproduction apparatus 100b may detect the change in the sampling frequency by receiving the packet including the content data.

<2. Summary>

As described above, according to the embodiment of the present invention, in the content reproduction system 10 including the plurality of the reproduction apparatus 100, one reproduction apparatus 100 is caused to function as a master unit and the remained reproduction apparatus 100 are caused to function as slave units. The reproduction apparatus 100 (reproduction apparatus 100a) which functions as a master unit transmits content to the reproduction apparatus 100 (reproduction apparatus 100b, 100c, 100d and etc) which function as slave units.

Then, in order to synchronize the reproduction of the content between the master unit and the slave units, the slave units query the master unit for the counter value held by the master unit on a regular basis. In response to the query from the slave unit side, the master unit returns the counter value to the slave units. The slave units which have received the counter value of the master unit perform processing of adjusting the sampling frequency by using the counter value. When adjusting the sampling frequency, the slave units perform the adjustment of the sampling frequency by taking into account the RTT of the packet and other disturbances.

In this manner, by achieving synchronization between the reproduction apparatus 100 which functions as a master unit and the reproduction apparatus 100 which function as a slave unit, the same content that is reproduced by the master unit can be also reproduced in the slave unit in the same timing.

Moreover, even in the case where there is a change in the sampling rate in the content reproduced in the master unit, by changing the sampling frequency both in the master unit and the slave unit according to the change in the sampling rate, the content can be reproduced at an appropriate sampling rate without imposing a load on the master unit.

Although the preferred embodiments of the present invention have been described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

What is claimed is:

1. A method comprising:
during a plurality of adjustment periods:
transmitting, from an apparatus, a query to a content server;
receiving, by the apparatus, a count value from the content server;
reproducing, by the apparatus, content in synchronization with the content server based at least in part on a sampling frequency of the content server; and
performing, by the apparatus, at least one synchronization correction for the reproduced content based at least in part on:
the received count value;
a round trip time between the transmission of the query and the reception of the count value; and
a difference between the sampling frequency of the content server and a sampling frequency of the apparatus during a previous adjustment period of the plurality of adjustment periods.

2. The method of claim 1, wherein the at least one synchronization correction performed during the plurality of adjustment periods substantially synchronize the sampling frequency of the apparatus with the sampling frequency of the content server.

3. The method of claim 2, wherein the at least one synchronization correction performed during the plurality of adjustment periods substantially synchronize the sampling frequency of the apparatus with the sampling frequency of the content server over a plurality of successive adjustment periods.

4. The method of claim 1, wherein the apparatus connects to the content server via a wireless connection, and wherein an average of the round trip time between the transmission of the query and the reception of the count value during the plurality of adjustment periods is greater than 1 ms.

5. The method of claim 1, further comprising increasing or decreasing a number of samples of the reproduced content.

6. The method of claim 5, further comprising increasing the number of the samples by interpolating between samples preceding and following a target sample.

7. The method of claim 1, further comprising synchronizing the sampling frequency of the apparatus according to a sampling clock of the content reproduced by the content server.

8. The method of claim 1, wherein the content is transmitted from the content server to the apparatus.

9. An apparatus, comprising:
a transmission unit configured to transmit a query to a content server;
a reception unit configured to receive a count value from the content server;
a reproduction unit configured to reproduce content in synchronization with the content server based at least in part on a sampling frequency of the content server; and
a correction unit configured to perform, during a series of adjustment periods, synchronization corrections for the reproduced content, the synchronization corrections based at least in part on:
the received count value;
a round trip time between the transmission of the query and the reception of the count value; and
a difference between the sampling frequency of the content server and a sampling frequency of the apparatus that occurred during a previous adjustment period of the series of adjustment periods.

10. The apparatus of claim 9, wherein the synchronization corrections are configured to synchronize the sampling frequency of the apparatus with the sampling frequency of the content server.

11. The apparatus of claim 10, wherein the synchronization corrections produce a substantial synchronization of the sampling frequency of the apparatus with the sampling frequency of the content server as a result of a series of successive synchronization corrections.

12. The apparatus of claim 9, wherein the correction unit is configured to perform the synchronization corrections by increasing or decreasing a number of samples of the reproduced content.

13. The apparatus of claim 12, wherein the correction unit is configured to increase or decrease the number of samples of the reproduced content in response to determining that the sampling frequency of the apparatus is greater than the sampling frequency of the content server.

14. The apparatus of claim 12, wherein the correction unit is configured to increase the number of the samples by interpolating between samples preceding and following a target sample.

15. The apparatus of claim 9, wherein the apparatus is configured to connect to the content server via a wireless connection.

16. The apparatus of claim 9, wherein the content reproduced by the reproduction unit is transmitted from the content server to the apparatus.

\* \* \* \* \*